United States Patent
Burg et al.

(10) Patent No.: US 7,356,137 B1
(45) Date of Patent: Apr. 8, 2008

(54) METHOD AND SYSTEM FOR SIGNALING PRESENCE OF USERS IN A MULTI-NETWORKED ENVIRONMENT

(75) Inventors: Frederick Murray Burg, West Long Branch, NJ (US); Steven T. Kanefsky, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 358 days.

(21) Appl. No.: 09/850,181

(22) Filed: May 7, 2001

(51) Int. Cl.
 *H04M 3/42* (2006.01)
(52) U.S. Cl. ............... 379/211.01; 379/201.07
(58) Field of Classification Search .......... 379/211.01, 379/215.01, 88.3, 88.22, 88.13, 88.14, 88.15, 379/88.12, 201.02, 188.14; 709/204; 370/260, 370/261, 201.02
 See application file for complete search history.

(56) References Cited

U.S. PATENT DOCUMENTS

| | | | |
|---|---|---|---|
| 4,893,335 A | | 1/1990 | Fuller et al. |
| 5,243,645 A * | | 9/1993 | Bissell et al. ........... 379/211.02 |
| 5,375,161 A | | 12/1994 | Fuller et al. |
| 5,588,037 A | | 12/1996 | Fuller et al. |
| 5,610,970 A | | 3/1997 | Fuller et al. |
| 5,790,785 A * | | 8/1998 | Klug et al. .................. 713/202 |
| 5,793,859 A * | | 8/1998 | Matthews .............. 379/211.03 |
| 5,805,587 A | | 9/1998 | Norris et al. ................ 370/352 |
| 5,805,682 A * | | 9/1998 | Voit et al. .............. 379/142.16 |
| 5,825,862 A * | | 10/1998 | Voit et al. .............. 379/142.16 |
| 5,896,448 A * | | 4/1999 | Holt ....................... 379/221.03 |
| 5,905,789 A * | | 5/1999 | Will ....................... 379/211.03 |
| 5,960,173 A * | | 9/1999 | Tang et al. .................. 709/201 |
| 6,052,372 A * | | 4/2000 | Gittins et al. ............... 370/396 |
| 6,115,737 A * | | 9/2000 | Ely et al. ..................... 709/203 |
| 6,125,176 A * | | 9/2000 | Foladare et al. ........ 379/211.02 |
| 6,130,938 A * | | 10/2000 | Erb ........................ 379/211.02 |
| 6,148,328 A | | 11/2000 | Cuomo et al. |
| 6,154,646 A * | | 11/2000 | Tran et al. ................... 455/417 |
| 6,215,790 B1 * | | 4/2001 | Voit et al. ................... 370/401 |
| 6,405,035 B1 * | | 6/2002 | Singh .................... 379/211.01 |
| 6,678,366 B1 * | | 1/2004 | Burger et al. ........... 379/211.03 |
| 6,807,423 B1 * | | 10/2004 | Armstrong et al. ......... 455/440 |
| 6,882,838 B1 * | | 4/2005 | Lee et al. .................... 455/417 |
| 2001/0005412 A1 * | | 6/2001 | Light et al. .............. 379/88.13 |
| 2002/0085701 A1 * | | 7/2002 | Parsons et al. ........ 379/211.01 |
| 2002/0146105 A1 * | | 10/2002 | McIntyre ............... 379/211.02 |
| 2002/0160757 A1 * | | 10/2002 | Shavit et al. ............... 455/414 |

* cited by examiner

*Primary Examiner*—Olisa Anwah
(74) *Attorney, Agent, or Firm*—Woodcock Washburn LLP (57) ABSTRACT

A user is associated with a plurality of communication devices each of which belongs to a different type of network. A Unified Presence Information System is configured to communicate with the different networks, and more particularly, to receive information concerning the status of the user's communication devices. The status information can include presence information and/or activity information. The status information can then be used (with or without user-defined preference information) to determine the network device with which the user is most likely in the vicinity of. This information may be used for a variety of purposes, including, but not limited to, directing an incoming communication request to a device where the user can most likely be reached.

15 Claims, 7 Drawing Sheets

FIG. 1

| Device | Device ID | Presence | Activity Date/Time |
|---|---|---|---|
| Telephone 36 | (000) 000-0000 | Off-hook | |
| PC 24 | Burg@att.net | On-line | |
| PC 24 | Burg@att.net | Off-line | 12/6/00 9:13pm |
| PC 24 | Burg@att.net | | |
| Set-Top 42 | 1234567ST | On | |

| 302 User ID: Burg | | | | Current Time: 10:05 PM, December 7, 2000 | |
|---|---|---|---|---|---|
| 310 | 320 | 330 Preferences | | 360 Status | |
| Devices | Device IDs | 342 Time Schedule | 352 Other | 370 Presence | 380 Activity |
| 312a PC24 | 322a Burg@att.com | 342a 9:00pm-10:00pm | 352a | 372a OFF-LINE | 382a 12/6/00 10:01pm |
| 312b PC26 | 322b Burg@att.net | 342b | 352b TTS to Tel 36 6:00pm-9:00pm | 372b OFF-LINE | 382b 12/7/00 5:00pm |
| 312c Telephone 36 | 322c (212) 555-1234 | 342c | 352c | 372c On-Hook | 382c 12/7/00 7:35am |
| 312d Telephone 38 | 322d (212) 555-6789 | 342d | 352d | 372d On-Hook | 382d 12/7/00 4:36pm |
| 312e TV 42 | 322e 1234567ST | 342e 10:00pm-11:00pm | 352e | 372e OFF | 382e 12/6/00 11:30pm |
| 312f Cellular Phone54 | 322f (212) 555-0000 | 342f | 352f | 372f ON | 382f 12/7/00 9:55pm |
| • • • • | • • • • | • • • • | • • • • | • • • • | • • • • |

METHOD AND SYSTEM FOR SIGNALING PRESENCE OF USERS IN A MULTI-NETWORKED ENVIRONMENT

FIELD OF THE INVENTION

This invention relates to a method and system for signaling to a user the presence of other users in a multi-networked environment. More particularly, the present invention relates to a method and system for determining one of a plurality of communication devices in a multi-networked environment at which a user can likely be reached.

BACKGROUND OF THE INVENTION

The communications environment has changed rapidly throughout the last decade. While traditional telephone service, i.e., a wired communication device, is still being used widely, several other types of communication devices are currently available. For example, cellular phones (i.e., wireless communication devices) have opened a new era of communication freeing people from geographical limitations associated with a wired telephone. The Internet, and, more particularly, e-mail has also revolutionized communications.

Thus, it is not unusual today for a person to be associated with several different types of communication devices simultaneously. For example, a person, using a telephone at home, may also have a cellular phone. In addition, the person may have an e-mail address on the Internet. Therefore, it is often not easy to reach a person at a specific one of the many communication devices with which he is associated. All of the communication devices with which a called party is associated may not be known. Even when this information is known, it is very cumbersome to have to try each of the communication devices in an attempt to reach the called party.

There have been methods to find the presence of a user within a limited network environment. For example, if a user is "on-line" using a PC and modem, this information can be used by an Internet Call Waiting (ICW) service to provide the user with notification of an incoming call through the PC. Similarly, if a user has turned on or off his cellular phone, the wireless network can provide the status of the user's cellular phone to other users of the network. In addition, the on/off status of a set-top box at a user's home can also provide an indication that the user may be at home watching TV.

SUMMARY OF THE INVENTION

The above-identified problems are solved and a technical advance is achieved in the art by providing a method and system of tracking status information of a user of communication devices in a multinetwork environment. An exemplary method includes: storing information about a plurality of communication devices associated with the user, wherein at least two of the communication devices belong to different types of networks; and receiving the status information regarding the at least two of the communication devices from respective networks.

In accordance with another aspect of the present invention, there is provided a method and system for providing a requestor with status information of a user. An exemplary method includes: storing information about a plurality of communication devices associated with the user, wherein at least two of the communication devices belong to different types of networks; receiving status information regarding the at least two of the communication devices from the respective networks; and providing the requester with the status information.

In accordance with yet another aspect of the present invention, there is provided a method and system for providing a requester with an identification of a device at which a user can likely be reached. An exemplary method includes: storing information about a plurality of communication devices associated with the user, wherein at least two of the communication devices belong to different types of networks; receiving status information regarding the at least two of the communication devices from the respective networks; selecting one of the at least two of the communication devices based on the status information; and providing the requestor with an identification of the selected communication device to which the user can most likely be reached.

In accordance with yet another aspect of the present invention, there is provided a method and system for providing an alternative communication path to a user. An exemplary method comprising: storing information about a plurality of communication devices associated with the user, wherein at least two of the communication devices belong to different types of networks; receiving status information regarding the at least two of the communication devices from respective networks; receiving a request for an alternative communication path to the user; selecting one of the communication devices of the user for the alternative communication path based on the status information; and directing the request for an alternative communication path to the network to which the selected communication device belongs, thereby enabling the network to establish a communication path to the selected communication device.

Other and further aspects of the present invention will become apparent during the course of the following detailed description and by reference to the attached drawings.

DETAILED DESCRIPTION

Figure 1:
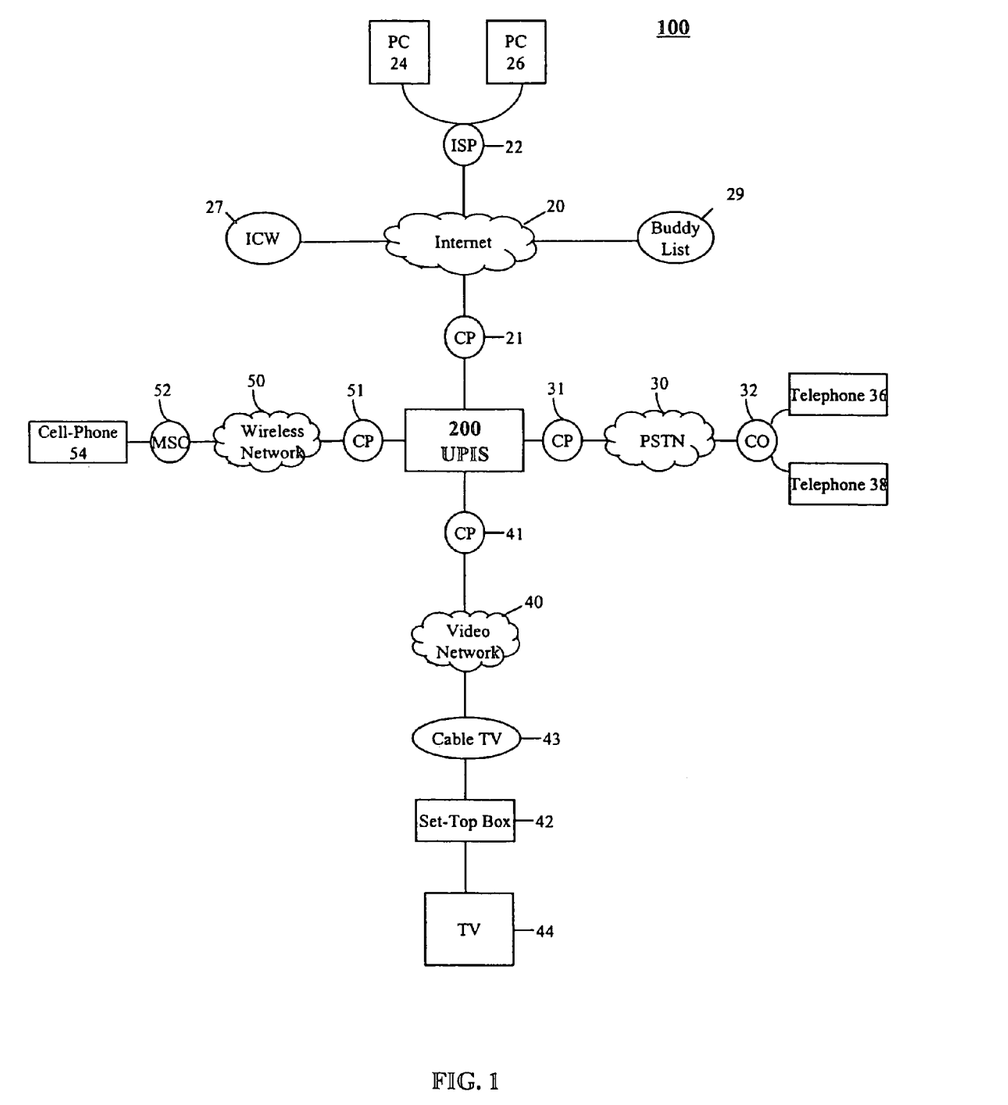
FIG. 1 is an overview of an exemplary network in which the unified presence information system of the present invention is implemented.

FIG. 1 is an overview of an exemplary network 100 in which the unified presence information system 200 (hereinafter "UPIS 200") of the present invention is implemented. Briefly, UPIS 200 is configured to communicate with different types of networks, thereby exchanging with the different types of networks the status information of the communication devices connected to those networks. The status information can include presence information and/or activity information of the communication devices. As will be described hereinafter, presence information indicates the state of the user's device, and thus, whether the user is currently reachable at the device. Activity information indicates when user activity, other than simply turning the device on or off, has occurred. UPIS 200 can then use the status information of the communication devices (with or without user-defined preferences) to increase the likelihood of locating the user at one of the user's communication devices, as will also be discussed in detail hereinafter. While the status information may be used in a variety of ways, in the example illustrated herein, it is used to direct a communication request to a communication device where the user can likely be reached. For example, a phone call directed to the user's home telephone may be directed to the user's personal computer, based on information that the user is more likely at home rather than away from home.

Network 100 of the embodiment of FIG. 1 includes UPIS 200 which is connected to Internet 20, Public Switched Telephone Network (PSTN) 30, Video Network 40 and Wireless Network 50. Other types of networks may also be connected to UPIS 200 provided that the networks can either collect a user's status information or: simply query the user's status information. Both PCs 24, 26 at the home and office of a user, respectively, are connected to UPIS 200 through Internet 20. Both Telephones 36, 38 at the home and office of the user, respectively, are connected to UPIS 200 through PSTN 30. Set-Top Box 42 of the user's home is connected to UPIS 200 through cable television company 43 of Video Network 40. The user's Cellular Phone 54 is connected to UPIS 200 through Mobile Switching Center (MSC) 52 of Wireless Network 50. For illustrative purposes, it is assumed that PCs 24, 26, Telephones 36, 38, Set-Top Box 42 and cellular phone 54 belong to the same user.

Contact Points (CPs) 21, 31, 41, 51 are gateways by which UPIS 200 communicates with the different types of networks 20, 30, 40, 50, respectively. The CPs are architectural elements that either exist as part of the various networks mentioned above or are new elements added for the purpose of interacting with UPIS 200. For example, in FIG. 1, when a user of PSTN 30 lifts the receiver of Telephone 36 (i.e., goes off-hook), indicating a new call is about to be originated, the Originating Attempt Trigger (OAT) corresponding to the user would be detected by his local switch—namely, central office (CO) 32. In turn, the switch notifies a Services Control Point (SCP) of PSTN 30 that the OAT has been detected. These interactions comprise standard Advanced Intelligent Network (AIN) operations. The SCP would check the user's records to determine what to do next. In the instance where the user's record indicates that the user is a UPIS service subscriber, the SCP would signal a Service Node (SN), also part of the AIN, to send a message to inform UPIS 200 that Telephone 36 is off-hook, and thus, that the user is not currently reachable at that device (absent an enhanced feature such as call waiting). In this case, the SN acts as CP 31 for PSTN 30. When Telephone 36 goes back on-hook (i.e., the call is terminated), the user's local switch (i.e., CO 32) would initiate a similar chain of events as described above but with the SN informing UPIS 200 that the telephone is now on-hook.

In the case of the video network 40, a mechanism like that described in U.S. Pat. Nos. 5,805,682 and 5,825,862 by Voit et al., which are incorporated herein by reference, could be used to provide UPIS 200 with a user's status information. Thus, the Digital Entertainment Terminal (DET) of Voit, which could be Set-Top Box 42 of the present invention, would inform interface point 17 of Voit, which could be CP 41, that the user is watching his TV. Informing messages sent by Set-Top Box 42 to UPIS 200 would usually identify the user device and the current presence information. In addition, other user actions that indicate actual activity on TV 44, rather than merely an on/off indication, may also be detected by Set-Top Box 42 and reported to UPIS 200. For example, if the user of TV 44, after having watched a program for 10 minutes, orders a pay-for-view movie, then UPIS 200 can be informed about this activity.

In the case of a user logging on to Internet 20 from PC 24, the PC may have already provided information to Internet Call Waiting (ICW) server 27 that the user is now on line, in a manner such as is described in U.S. Pat. No. 5,805,587 to Norris et al. ICW server 27 would then send a message through CP 21 to UPIS 200 indicating the on-line status of the user. In this instance, UPIS 200 may be connected directly to Internet 20 so that a distinct CP 21 is not needed. When the user receives a call as described in the Norris patent and makes a selection of how to dispose of the call, this activity (beyond just knowing that PC 24 is logged on to the Internet) can also be noted.

Similar mechanisms would apply to Wireless Network 50 and its CP 51.

Figure 2:
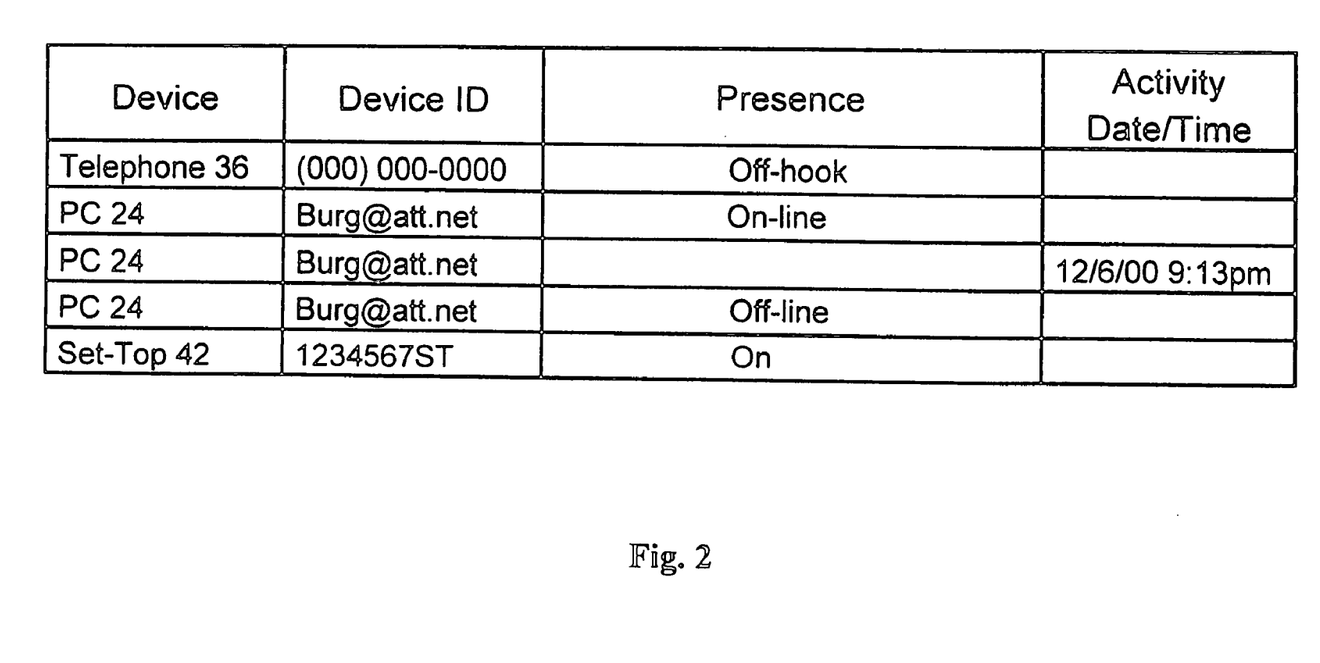
FIG. 2 illustrates exemplary messages for presence and activity information.

FIG. 2 illustrates exemplary messages sent by various types of CPs to UPIS 200 over time. An exemplary message includes fields for a device type (e.g., PC 24), a device or user ID (e.g., Burg@att.net), presence information (e.g.; when PC 24 goes on-line or off-line) and activity information (e.g., PC 24 was sending an e-mail message at 9:13 on 12/6). The dates/times associated with presence and activity information can also be included in the messages.

Figure 3:
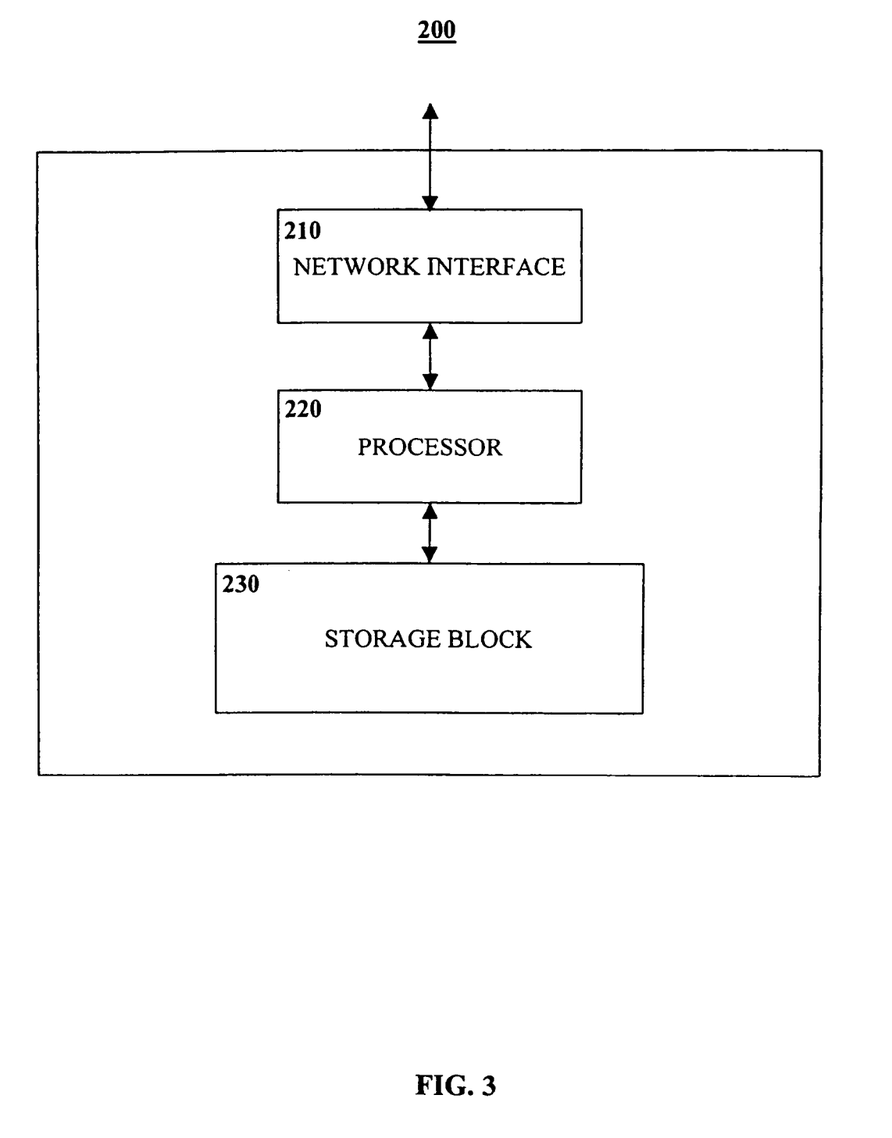
FIG. 3 is a block diagram of an exemplary embodiment of the unified presence information system shown in FIG. 1.

FIG. 3 is a block diagram of an exemplary embodiment of the UPIS 200 shown in FIG. 1. UPIS 200 comprises network interface 210, processor 220 and storage block 230. Network interface 210 enables communications with a variety of different types of networks. Processor 220 is configured to control the operation of UPIS 200 together with other components of UPIS 200 such as ROM, RAM, etc. (not shown). Storage block 230 comprises at least one user account record 300 for maintaining user information as will be described in detail hereinafter. Alternatively, the functionality of UPIS 200 may be distributed to multiple separate units.

Figure 4:
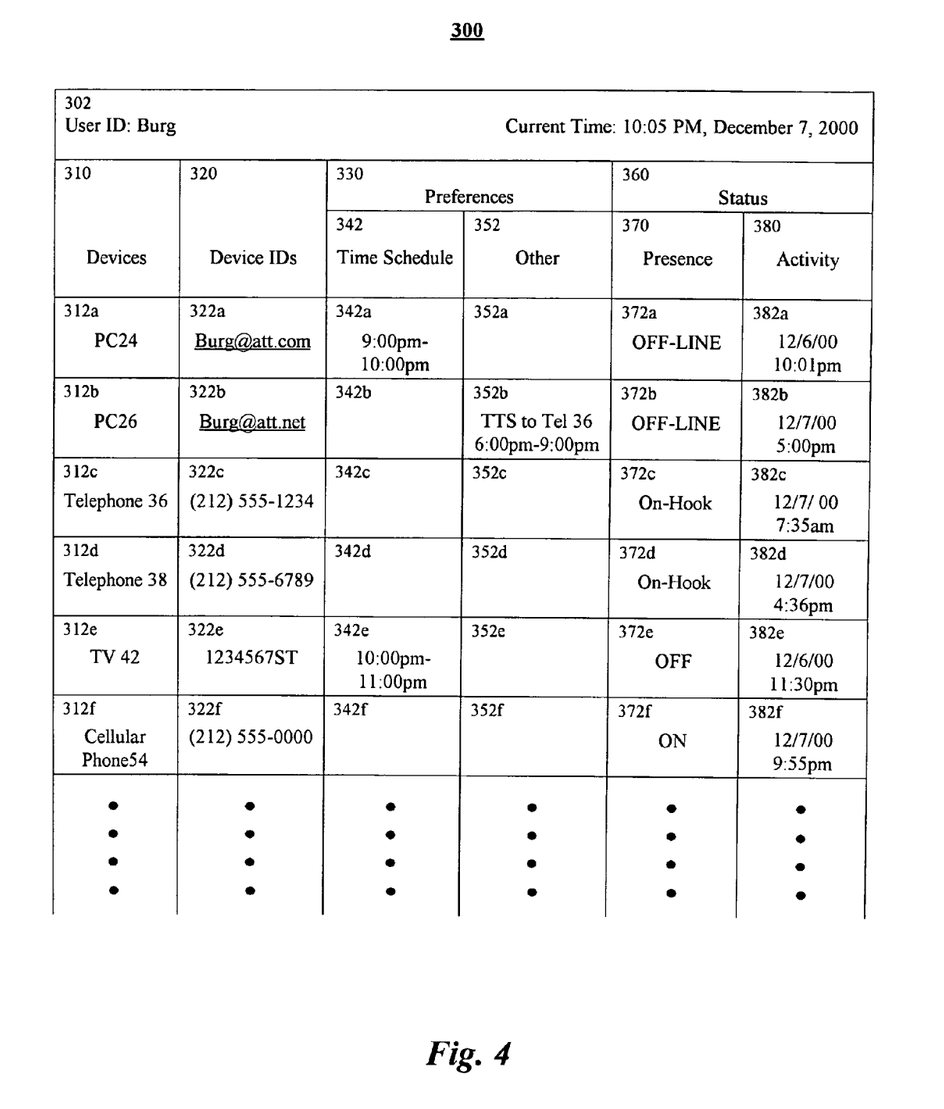
FIG. 4 illustrates an exemplary user's account in a storage device of the unified presence information system.

FIG. 4 illustrates an exemplary user account in a storage device of UPIS 200 such as storage block 230. Account record 300 maintains in field 320 the identification information of the user's communication devices (e.g., IP address, telephone number, serial number etc.). Account record 300 also maintains in field 330 the preference information as defined by the user (e.g., time schedule, special call treatment, etc.) as well as the status information of the devices in field 360. In the illustrative embodiment, the status information includes presence information (see field 370) and activity information (see field 380).

In accordance with one embodiment, the identification and preference information may be inputted and controlled by the user, while the status information may be controlled by UPIS 200. Account 300 may also include billing information associated with charging fees for the UPIS service.

It will be understood that the types of information maintained in account 300 may vary depending on the particular needs of both the users and the operators of UPIS 200.

The operation of UPIS 200 will now be described with reference to the flow charts of FIGS. 5-7 and exemplary account 300 of FIG. 4.

Figure 5:
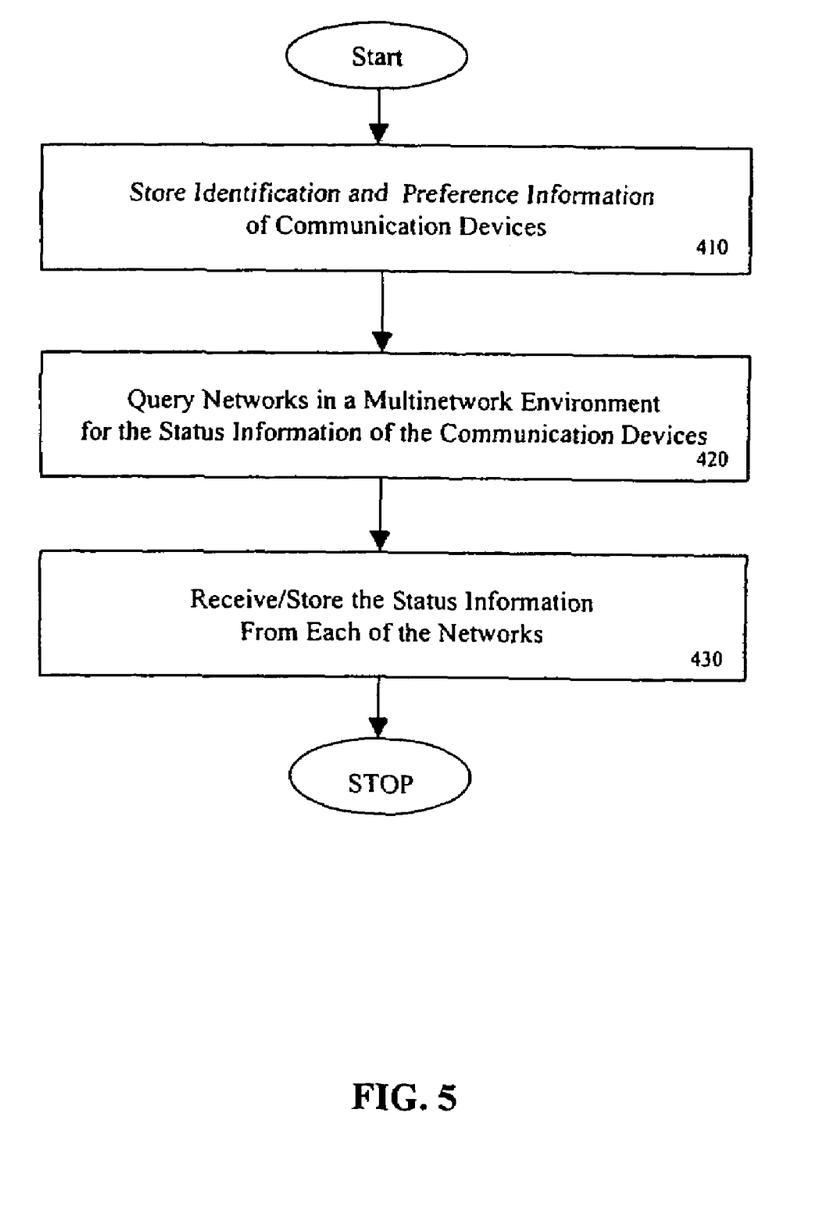
FIG. 5 is a flow chart illustrating an exemplary process by which the unified presence information system collects and stores status information obtained in a multi-network environment.

FIG. 5 is a flow chart illustrating an exemplary process by which UPIS 200 collects and stores status information obtained in a multi-network environment.

At step 410 of FIG. 5, UPIS 200 stores information concerning the communication devices of a user. In accordance with an advantageous embodiment of the present invention, a user may visit an Internet portal site of UPIS 200 and follow a predetermined registration procedure to enroll in the service of UPIS 200. The user will select (or be provided with) a username and password for use in managing his account information. The user would then input to UPIS 200 information concerning his communication devices (e.g., login ID, telephone number, serial number etc.) using a graphical user interface (GUI) as an example. Each of the communication devices belongs to different types of networks (e.g., Internet 20, PSTN 30, Video Network 40 etc.).

The user may also input the preference information such as a time schedule for receiving communications on a particular device and other specifics regarding call handling and billing information. For example, referring to account record 300 of FIG. 4, it is indicated in time schedule field 340 of FIG. 4 that the user wants to direct phone call notification information to his home PC 24 between the hours of 9:00 pm-10:00 pm (see field 342a) if the user is active on PC 24 during that time period. The user may also want to direct phone call information to Set-Top Box 42 between the hours of 10:00 pm-11:00 pm (see field 342e), thereby displaying phone call information on the television screen connected to Set-Top Box 42 if the set-top box is active during that time. The user may also want to have a Text-to-Speech (TTS) service for e-mails received by his office PC 26 between the hours of 6:00 pm-9:00 pm (see field 352b).

At step 420 of FIG. 5, UPIS 200 queries the various networks, and, more particularly, the CPs therein, for the status information of the user's communication devices. Alternatively, the CPs could report this information to UPIS 200 without receiving a query from UPIS 200. Referring to FIG. 1, in accordance with an embodiment, UPIS 200 queries CP 21 for the status of PCs 24, 26. CP 21 then queries ISP 22 for the status information whether PCs 24, 26 are on-line and whether there is any user activity such as web browsing or sending or receiving e-mail messages. ISP 22 may be configured to inform the status information to CP 21. UPIS 200 queries CP 31 for the status of Telephones 36, 38. CO 32 with the user's OAT enabled detects and notifies the SCP of PSTN 30 with the information as to whether any of Telephones 36, 38 go off-hook, and the SCP then informs CP 31 of the received information from CO 32. By accumulating the information, CP 31 determines the status information such as whether the telephones are currently on/off line or when the telephones were last off-hook etc. CO 32 is a local office to, and serves, Telephones 36 and 38. UPIS 200 queries CP 41 for the status of Set-Top Box 42. CP 41 then queries Cable TV Company 43 or Set-Top Box 42 for the status information whether the user's television is turned "on". Cable TV Company or Set-Top Box 42 may be configured to inform the status information to CP 41. UPIS 200 queries CP 51 for the status of cellular phone 54 whether the cellular phone is turned on and when it last made or received a call. CP 51 then queries MSC 52 for the status information. MSC 52 may be configured to inform the status information to CP 51. Such queries from UPIS 200 may be delivered simultaneously to the CPs of various networks or UPIS 200 may set a specific order for the queries. Moreover, UPIS 200 may perform the querying function regularly (e.g., every "x" seconds) to maintain the most up-to-date status information concerning the user's devices. Other types of communications networks, if available, may be queried in a similar fashion.

At step 430 of FIG. 5, UPIS 200 receives the status information of the communication devices from each of the networks via CP 21, CP 31, CP 41, CP 51. UPIS 200 then stores the received information in the appropriate fields of user account record 300. For example, referring to FIG. 4, UPIS 200 stores the status information in status field 360 of account record 300. Assuming that the current time/date is 10:05 pm of Dec. 7, 2000, it is indicated in fields 372a and 382a, respectively, of FIG. 4, that the user's home PC 24 is currently off-line and was last active last night at 10:01 pm (see field 382a). Similarly, it can be seen that his office PC 26 is also off-line and was last active today at 5:00 pm (see fields 372b, 382b). Status information is stored for the user's other devices as well. For example, his home Telephone 36 is currently on-hook and was last active (e.g., off-hook) today at 7:35 am (see fields 372c, 382c). His office Telephone 38 is currently on-hook and was last active (e.g., off-hook) today at 4:36 pm (see fields 372d, 382d). His TV 44 is currently turned off and was last turned on last night at 11:30 pm (see fields 372e, 382e). Lastly, his cellular phone 54 is turned on and was last active today at 9:55 pm (see fields 372f, 382f).

Figure 6:
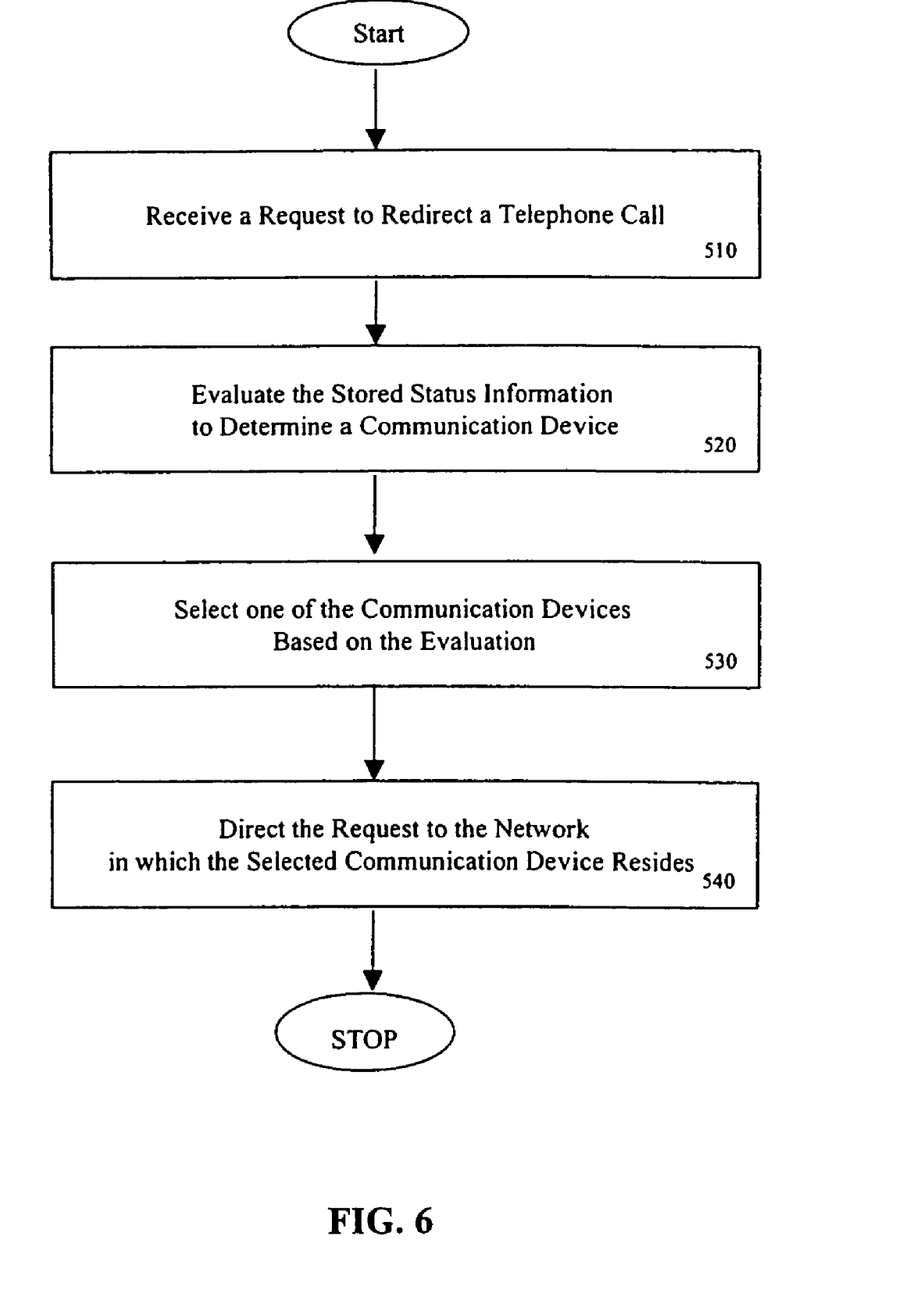
FIG. 6 is a flow chart illustrating an exemplary process by which the unified presence information system directs a communication request to the appropriate network based on a user's status information obtained in a multi-network environment.

FIG. 6 is a flow chart illustrating an exemplary process by which UPIS 200 directs a communication request to the appropriate network based on a user's status information obtained in a multinetwork environment.

At step 510 of FIG. 6, UPIS 200 receives a request from a CP to direct a phone call, that the associated network was unable to complete due to the called party's absence, to an alternate communication device of the called party. The request includes both calling and called party information. For example, a calling party may be trying to reach a called party at Telephone 36 in PSTN 30. After waiting a predetermined period of time (e.g., 7 ring signals), PSTN 30 would conclude that the called party is not available, and notify CP 31 that the communication request has failed. After receiving this information from PSTN 30, CP 31 requests UPIS 200 to direct the communication request to an alternative communication device (e.g., PC 24, PC 26 or Set-Top Box 42).

At step 520, UPIS 200 evaluates the status information received and stored in step 430 of FIG. 5 to determine a communication device at which the called party can likely be reached. Using a pre-determined algorithm, UPIS 200 decides which communication device would be the best choice for reaching the user. For example, referring again to FIG. 4, UPIS 200 may compare field 380 of account record 300 to determine which device was most recently active. As shown in field 380, cellular phone 54 was the most recently active device. The algorithm of UPIS 200 may decide that directing communication requests to cellular phone 54 would be the best way to reach the user since phone 54 was active only ten minutes ago, i.e., at 9:55 pm (see field 382f). If the amount of time that has elapsed between the current time and the last active time exceeds a predetermined threshold, the algorithm may use additional information to decide which device would be the best choice for reaching the user. The algorithm may consider the current time of day and the history of the user's activity. It is shown in fields 382a-f that the user usually is in the office between the hours of 9:00 am-5:00 pm and is at home after 9:00 pm. Assuming the current time is 10:05 pm on a weekday, the algorithm may decide that the user is at home and may be reachable through home PC 24, Telephone 36, TV 44 or cellular phone 54. As a "tie-breaker", the algorithm may also take into account the user's pre-defined preferences as found in field 330 in deciding which communication device to select. For example, referring to the previous example where the evaluation algorithm of UPIS 200 identified cellular phone 54 as the best way to reach the user, if TV 44 were also turned on, the evaluation algorithm of UPIS 200 could have then considered the user's preference information in field 342e of FIG. 4 in which the user requested any phone call received between 10:00-11:00 pm to be directed to his TV 44 through Set-Top Box 42. In this case, UPIS 200 could have selected Set-Top Box 42 rather than cellular phone 54 as the best way to reach the user.

At step 530 of FIG. 6, UPIS 200 selects one of the communication devices based on the evaluation discussed above in connection with step 520. In the instant example, UPIS 200 selects cellular phone 54 as the alternative communication device having the highest probability for reaching the user at the current time.

At step 540 of FIG. 6, upon selecting an alternative communication device, UPIS 200 directs the request to the CP of the network where the communication device selected in step 530 resides. In the present example, UPIS 200 will forward the communication request to CP 51 where the cellular phone 54 is connected. Subsequently, via MSC 52, Wireless Network 50 will establish a signaling channel to cellular phone 54 to notify the user of the call (e.g., by ringing Cellular Phone 54), and, ultimately, establish a communication path to cellular phone 54.

In another example, if cable television company 43 of Video Network 40 was selected in step 530 as having the best chance for reaching the user and UPIS 200 received a communication request from CP 51 (i.e., a communication request was originally initiated at Wireless Network 50), UPIS 200 will direct the request to CP 41 for forwarding of the request to Set-Top Box 42. CP 41 may be configured to send a signal to cable television company 43 so that Cable Television company 43 can forward the signal to Set-Top Box 42 to display the calling party information on the user's television screen. Upon viewing the calling party information on the television screen, the user may decide to take the phone call at any one of his communication devices (i.e., either PC 24, Telephone 36, or cellular phone 54). The remote controller of the user's television may be configured to select these call treatment options. For example, the user may decide not to take the phone call after viewing the caller information on the television screen, thereby enabling UPIS 200 to handle the call according to a predetermined call treatment procedure, if any, such as forwarding a voice call to voice mail.

In yet another example, if PC 24 was selected by UPIS 200 in step 530 as having the best chance of reaching the user and UPIS 200 receives a communication request from CP 51 (i.e., a communication request was originally initiated at Wireless Network 50), UPIS 200 will direct the request to CP 21 to forward the request to PC 24. Alternatively, UPIS 200 may direct the request to ICW server 27 to forward the request to PC 24 using the Internet Call Waiting service as described above in connection with U.S. Pat. No. 5,805,587 to Norris et al. The calling party information will then be displayed on the screen of PC 24. Upon receiving the calling party information, the user may select from one of several predetermined call treatment options. The user may decide to take the phone call either at home Telephone 36, or the user may opt to direct the call to a voice message system.

Figure 7:
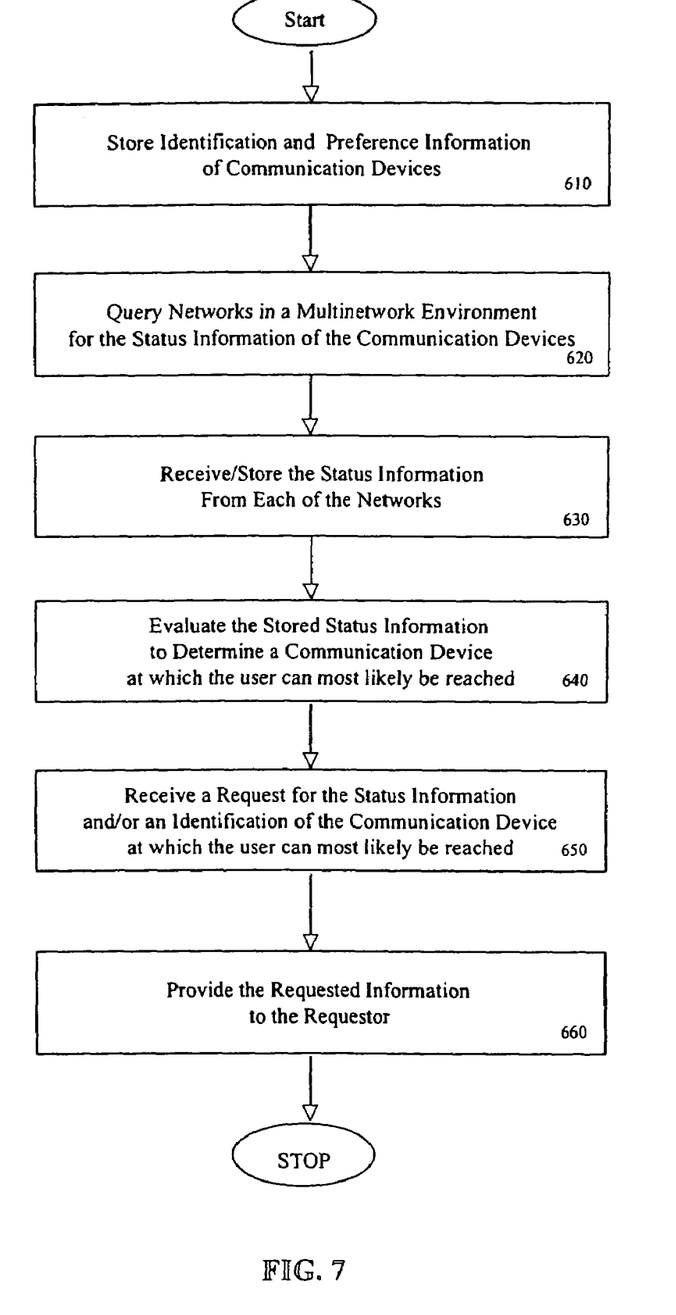
FIG. 7 is a flow chart illustrating an exemplary process by which the unified presence information system provides a requestor with status information obtained in a multi-network environment.

FIG. 7 is a flow chart illustrating an exemplary process by which UPIS 200 provides a requestor with presence information obtained in a multi-network environment.

Each of steps 610, 620, 630 of FIG. 7 are essentially the same as steps 410, 420, 430 of FIG. 5, and step 640 of FIG. 7 is essentially the same as step 520 of FIG. 6. Thus, they will not be described further here. At step 650 of FIG. 7, UPIS 200 receives a request for a user's status information. In contrast to the method of FIG. 6, wherein the status information is used to re-direct a communication request, any service agency who may need the status information of a user may request the information from UPIS 200. For example, a service agent such as Buddy List that has a contract with UPIS 200 may request a user's status information from UPIS 200 for use in supplying that information to their service subscribers. In that case, the service agent may supply UPIS 200 with information such as the user's e-mail address, cellular phone number, etc., for use as an identifier in retrieving the user's account record. At step 660, upon receiving the request, UPIS 200 provides the status information to the requester. Alternatively, the request in step 650 may be a request for the identity of a communication device at which the user can likely be reached, which, in step 660, would then be provided to the requester. The requester may either be a regular subscriber or a one-time user for the service of UPIS 200.

The many features and advantages of the present invention are apparent from the detailed description, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, much of the functionality described above as being provided by the contact points of the various networks alternatively could be incorporated into the functionality provided by UPIS 200. Thus, the UPIS 200 could monitor/query the various networks for call requests, rather than the contact points reporting the call requests to UPIS 200.

What is claimed is:

1. A method of establishing a communication session, the method comprising:

at a central location, storing information about a plurality of communication devices associated with an intended recipient and with different respective networks in a multi-networked environment, wherein a first device of the plurality of communication devices comprises a set-top box associated with a video network, and wherein a second device of the plurality of communication devices is associated with a second network that comprises a network other than the video network;

at the central location, receiving status information regarding the set-top box and the second device from the video network and the second network, respectively, wherein the status information comprises information other than, or in addition to, whether the multiple communication devices are on or off, and wherein the storing and receiving of status information occurs independently of receiving a request for establishing the communication session between a communication initiator and the intended recipient;

at the central location, receiving the request to facilitate establishing the communication session;

at the central location, in response to the received request, selecting one of the set-top box and the second device at which the intended recipient can likely be reached, wherein the selection is based, at least in part, on an evaluation of the received status information; and directing a call to one of the set-top box and the second device to enable the communication session to be established between the communication initiator and the intended recipient.

2. The method of claim 1 wherein the storing is performed through an Internet portal site by providing the intended recipient with a predetermined registration procedure to enroll in the service of the method.

3. The method of claim 1 wherein the status information regarding the set-top box and the second device includes an indication of whether the set-top box and the second device are currently on-line and when they were last active.

4. In a multi-networked environment, a method of determining a communication device at which a user can likely be reached, the method comprising:

querying different types of networks in the multi-networked environment for status information, wherein the status information pertains to a plurality of communication devices associated with the user, including at least a set-top box and a second, different communication device, wherein the set-top box is associated with a video network in the multi-network environment and the second communication device is associated with a second, different network in the multi-networked environment;

receiving the status information for the set-top box and the second communication device from the video network and the second network, respectively, wherein the status information includes status information other than, or in addition to, an indication of whether the set-top box and the second communication device are on or off, and wherein the querying and receiving of status information occurs independently of receiving a request for establishing a communication session between a communication initiator and the user; and in response to receiving the request, selecting one of the set-top box and the second communication device as a preferred communication device based on the received status information.

5. The method of claim 4 wherein the status information includes activity information associated with the set-top box and the second communication device.

6. The method of claim 4 wherein the status information includes presence information associated with the set-top box and the second communication device.

7. The method of claim 4 wherein the second communication device includes one of a telephone, a cellular phone, or a personal computer.

8. The method of claim 4 wherein the second network is one of an Internet, a telephone network, or a cellular phone network.

9. The method of claim 4 wherein the steps of querying, receiving, and selecting occur within an information system configured to communicate with the different types of networks in the multi-networked environment.

10. The method of claim 4 wherein the steps of querying, receiving, and selecting occur within an information system configured to communicate with the different types of networks in the multi-networked environment, and wherein the information system is a unified presence information system.

11. An apparatus for facilitating a communication session between a requestor and a user, the apparatus comprising:

a network interface configured for
querying a plurality of different types of networks in a multi-networked environment for status information, wherein the status information pertains to a plurality of communication devices associated with the user, including a set-top box and a second communication device, wherein the set-top box is associated with a video network in the multi-network environment and the second communication device is associated with a second, different network in the multi-networked environment;

receiving the status information for the set-top box and the second communication device, wherein the status information includes status information other than, or in addition to, an indication of whether the set-top box and the second communication device are on or off, and wherein the querying and receiving of status information occurs independently of receiving a request for establishing the communication session between the requester and the user;

a storage block configured for storing the received status information; and a processor configured for selecting a preferred communication device from one of the set-top box and the second communication device based on the received status information, wherein the processor performs the selecting in response to receiving the request for establishing the communication session with the user.

12. The method of claim 4 further comprising causing information associated with the communication initiator to be displayed on the preferred communication device.

13. The method of claim 4 further comprising directing a call to one of the video network and the second network to which the preferred communication device belongs to enable the communication session to be established with the preferred communication device.

14. The method of claim 4, wherein the second communication device includes one of a telephone, a cellular phone, and a personal computer.

15. A method of identifying a communication device at which a user can likely be reached, the method comprising:

storing information about a plurality of communication devices associated with the user and with different respective networks in a multi-networked environment, wherein the plurality of communication devices include a set-top box associated with a video network and a second communication device associated with a second, different network;

receiving status information regarding the set-top box and the second communication device from their respective networks, wherein the status information comprises information other than, or in addition to, whether the set-top box and the second communication device are on or off, and wherein the storing and receiving of status information occurs independently of receiving a request for the identity of the communication device from a requestor;

receiving the request for the identity of the communication device from the requestor;

selecting the communication device at which the user can likely be reached from one of the set-top box and the second communication device associated with the user, wherein the selection is based, at least in part, on an evaluation of the received status information; and providing the requester with the identity of the communication device at which the user can likely be reached in order to facilitate the communication session between the requester and the user.

\* \* \* \* \*